United States Patent
Ogasahara

(10) Patent No.: US 8,542,290 B2
(45) Date of Patent: Sep. 24, 2013

(54) CAMERA MODULE, IMAGE PROCESSING APPARATUS, AND IMAGE RECORDING METHOD

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 12/958,781

(22) Filed: Dec. 2, 2010

(65) Prior Publication Data
US 2011/0157399 A1 Jun. 30, 2011

(30) Foreign Application Priority Data
Dec. 24, 2009 (JP) ................. 2009-293283

(51) Int. Cl.
*H04N 5/228* (2006.01)
*H04N 9/09* (2006.01)

(52) U.S. Cl.
USPC .................. 348/222.1; 348/262; 348/265

(58) Field of Classification Search
None
See application file for complete search history.

(56) References Cited

U.S. PATENT DOCUMENTS

| 8,339,483 B2* | 12/2012 | Ogasahara | 348/251 |
|---|---|---|---|
| 2008/0030596 A1* | 2/2008 | Sung et al. | 348/224.1 |
| 2008/0030601 A1* | 2/2008 | Sung et al. | 348/265 |
| 2008/0193034 A1* | 8/2008 | Wang | 382/254 |
| 2010/0097491 A1* | 4/2010 | Farina et al. | 348/223.1 |
| 2010/0246892 A1* | 9/2010 | Hirasawa et al. | 382/106 |
| 2011/0043665 A1* | 2/2011 | Ogasahara | 348/241 |

FOREIGN PATENT DOCUMENTS

| JP | 2000-209601 | 7/2000 |
|---|---|---|
| JP | 2005-303694 | 10/2005 |
| JP | 2005-354610 | 12/2005 |
| JP | 2006-33759 | 2/2006 |
| JP | 2008-11529 | 1/2008 |
| JP | 2009-111774 | 5/2009 |

OTHER PUBLICATIONS

U.S. Appl. No. 12/818,617, filed Jun. 18, 2010, Takayuki Ogasahara.
Notice of Rejection issued Feb. 12, 2013 in Japanese Patent Application No. 2009-293283 (with English translation).
Chinese Office Action mailed on May 15, 2013, in Chinese Patent Application No. 201010605613.X (with English Translation).

* cited by examiner

*Primary Examiner* — Lin Ye
*Assistant Examiner* — John H Morehead, III
(74) *Attorney, Agent, or Firm* — Oblon, Spivak, McClelland, Maier & Neustadt, L.L.P.

(57) ABSTRACT

According to one embodiment, a camera module includes a plurality of sub-camera modules. The sub-camera modules include imaging elements and imaging lenses. At least two of the sub-camera modules include the imaging lenses, subject distances of which when best-focused are set different from each other.

19 Claims, 6 Drawing Sheets

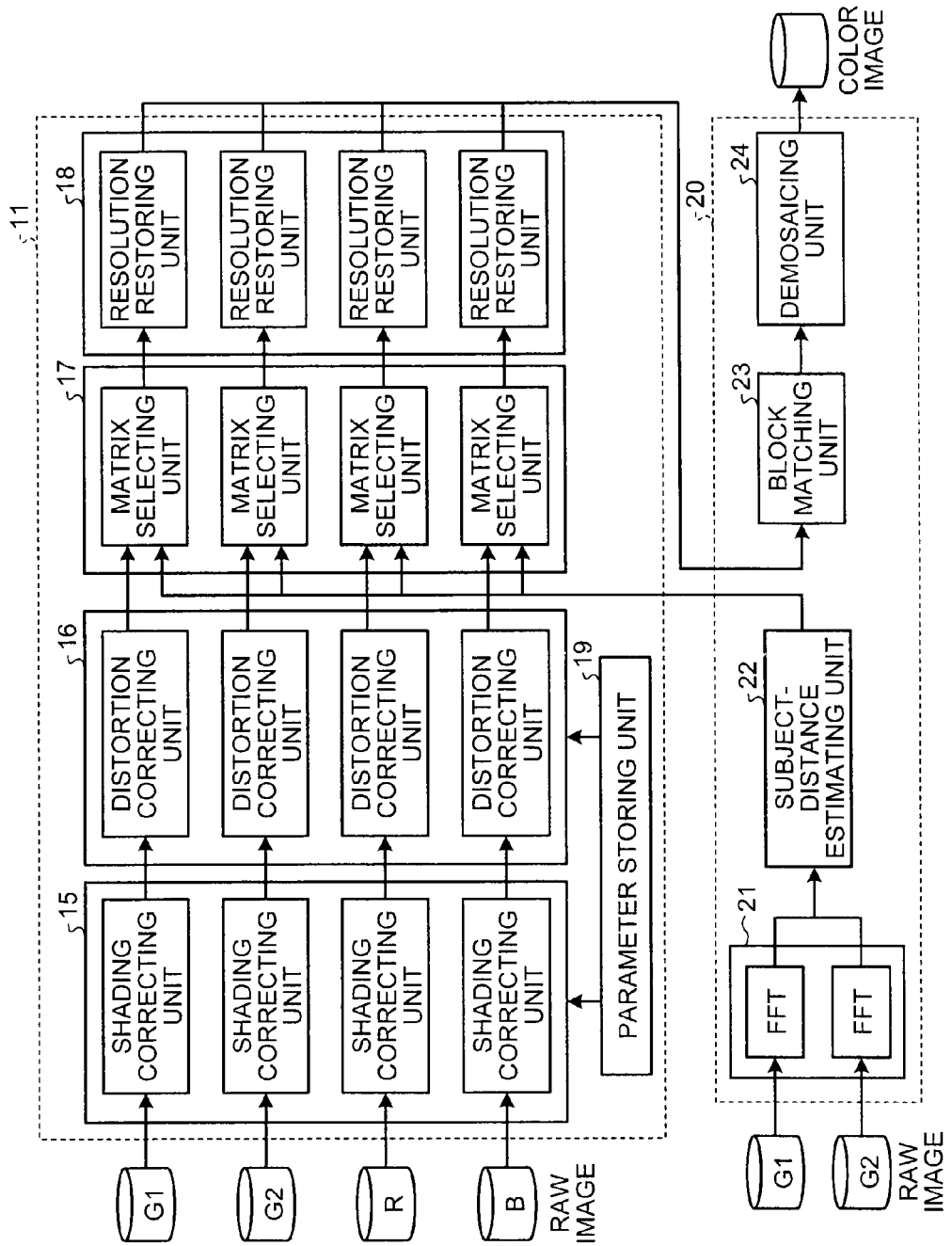

CAMERA MODULE, IMAGE PROCESSING APPARATUS, AND IMAGE RECORDING METHOD

CROSS-REFERENCE TO RELATED APPLICATIONS

This application is based upon and claims the benefit of priority from the prior Japanese Patent Application No. 2009-293283, filed on Dec. 24, 2009; the entire contents of which are incorporated herein by reference.

FIELD

Embodiments described herein relate generally to a camera module, an image processing apparatus, and an image recording method.

BACKGROUND

In the past, for example, a lens module having an autofocus (AF) function is used for photographing in a wide range from near distance to infinity. However, when the AF function is adopted, the number of lenses and the number of components increase and cost increases according to the increase in the number of lenses and the number of components. In particular, in a camera module used in a digital camera or the like, a distance between a lens and an imaging element (focal length) tends to be reduced as much as possible according to demands for a reduction in thickness and a reduction in size.

In recent years, a technology called EDoF (Extended Depth of Field) for securing sufficient depth of field by combining a fixed-focus lens and signal processing has been developed. Whereas a lens for AF only has to be capable of securing resolution in a focus position, the fixed-focus lens for EDoF has insufficient resolution because the depth of field is secured. For example, when a relation between depth of field and a modulation transfer function (MTF) is represented by a graph, whereas, in the lens for AF, the graph is a graph with narrow range width, in the fixed-focus lens for EDoF, the graph is a graph with wide range width. Concerning such a lens characteristic of the fixed-focus lens for EDoF, the insufficiency of the resolution is supplemented by the signal processing. Therefore, an S/N (a signal to noise ratio) tends to deteriorate in a process of the signal processing. Further, because there is a limit in supplementation of the depth of field, in general, lens design is performed with importance attached to resolution in the infinity. Therefore, it is difficult to obtain sufficient resolution in the near distance.

BRIEF DESCRIPTION OF THE DRAWINGS

FIG. 7 is a block diagram of the configuration of an image processing apparatus according to a modification of the embodiment.

DETAILED DESCRIPTION

In general, according to one embodiment, a camera module includes a plurality of sub-camera modules. The sub-camera modules include imaging elements and imaging lenses. The imaging elements pick up subject images. The imaging lenses make light captured from a subject incident on the imaging elements. At least two of the sub-camera modules include the imaging lenses, subject distances of which when best-focused are set different from each other. The subject distances are distances between the sub-camera modules and the subject.

Exemplary embodiments of a camera module will be explained below in detail with reference to the accompanying drawings. The present invention is not limited to the following embodiments.

Figure 1:
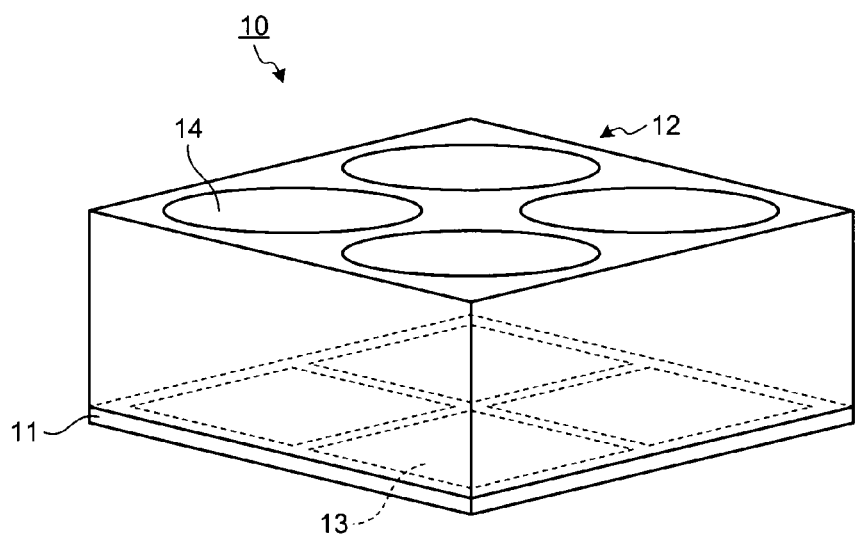
FIG. 1 is a schematic perspective view of a camera module according to an embodiment.

FIG. 1 is a schematic perspective view of a camera module 10 according to an embodiment. The camera module 10 includes an image sensor unit 11 and a lenslet 12. The image sensor unit 11 includes four imaging elements 13 that pick up subject images. The lenslet 12 includes four imaging lenses 14 arranged on a plane to correspond to the imaging elements 13.

The camera module 10 includes four independent sub-camera modules including the imaging elements 13 and the imaging lenses 14. The sub-camera modules respectively pick up color components of the subject images. The imaging lenses 14 make light captured from a subject incident on the imaging elements 13. The imaging elements 13 convert the light captured by the imaging lenses 14 into a signal charge.

Figure 2:
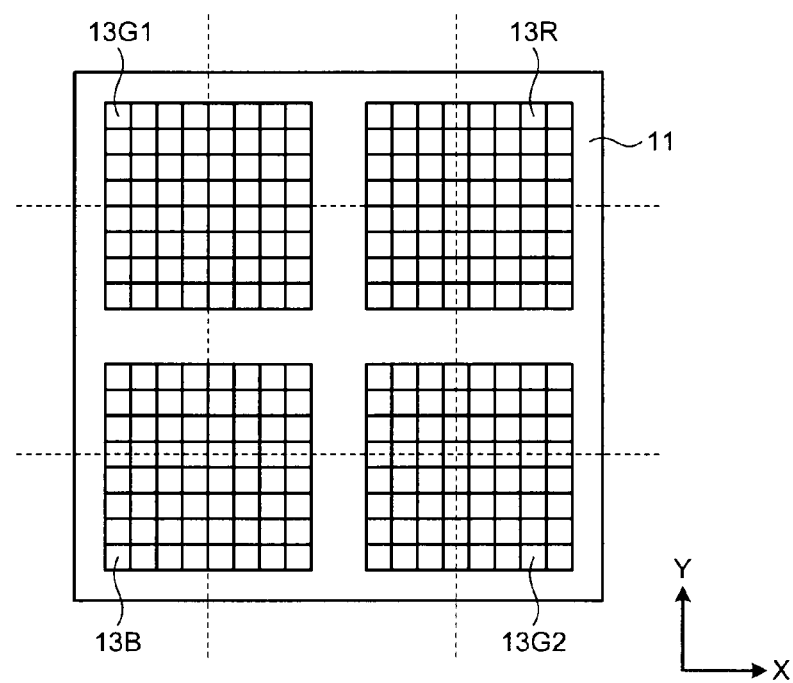
FIG. 2 is a top schematic view of an image sensor unit.

FIG. 2 is a top schematic view of the image sensor unit 11. The four imaging elements 13 (13G1, 13R, 13B, and 13G2) are arranged in a 2×2 matrix shape. The imaging element 13R for red (R) light, the imaging element 13B for blue (B) light, and the two imaging elements 13G1 and 13G2 for green (G) light are arranged such that the two imaging elements 13G1 and 13G2 for G light are obliquely opposed to each other as in the Bayer array.

The sub-camera module for R including the imaging element 13R for R light picks up an R component of the subject images. The sub-camera module for B including the imaging element 13B for B light picks up a B component of the subject images. The sub-camera module for G1 including the imaging element 13G1 for G light and the sub-camera module for G2 including the imaging element 13G2 for G light pick up G components, which are same color components, of the subject images. The same color components include not only color components of color lights in the same wavelength region but also color components recognized as substantially the same color lights having wavelength regions close to each other.

The camera module 10 reduces the focal length of the imaging lenses 14 by adopting a configuration including the lenslet 12. This makes it possible to reduce a distance between the imaging elements 13 and the imaging lenses 14. The camera module 10 can prevent interference of signals with respect to different color components between pixels adjacent to each other by providing pixels for the same color components in the sub-camera modules. This makes it possible to reduce color mixture and substantially improve sensitivity. Lens designs for the imaging lenses 14 of the sub-camera modules can be optimized with respect to the respective color components. This makes it possible to substantially reduce longitudinal chromatic aberration. The camera module 10 can increase an F value because of the improvement of the sensitivity. This makes it possible to greatly expand depth of field while keeping a noise level equivalent to a noise level obtained when pixels for the respective colors are mixed in the imaging elements as the Bayer array.

Among the four sub-camera modules, the sub-camera module for G1 is set as a reference sub-camera module. In the plane shown in FIG. 2, a direction in which the imaging element 13G1 for G light of the reference sub-camera module and the imaging element 13R for R light of the sub-camera module for R are arranged in parallel is represented as X direction. A direction in which the imaging element 13G1 for G light of the reference sub-camera module and the imaging element 13B for B light of the sub-camera module for B are arranged in parallel is represented as Y direction. The X direction and the Y direction are perpendicular to each other.

Intersections of broken lines shown in FIG. 2 respectively represent center positions of the imaging elements 13G1, 13R, 13B, and 13G2 at the time when it is assumed that imaging positions of the subject images of the respective color components coincide with each other. If the imaging position of the subject image by the sub-camera module for G1 is set as a reference, the sub-camera module for R is arranged such that the imaging position of the subject image is shifted by a half pixel in the X direction with respect to the reference. The sub-camera module for B is arranged such that the imaging position of the subject image is shifted by a half pixel in the Y direction with respect to the reference. The sub-camera module for G2 is arranged such that the imaging position of the subject image is shifted by a half pixel in each of the X direction and the Y direction with respect to the reference. Because one of the sub-camera modules for G is set as the reference sub-camera module and the subject image of the G component having a high luminous efficiency is set as the reference, an accuracy difference in image processing explained later is reduced.

Figure 3:
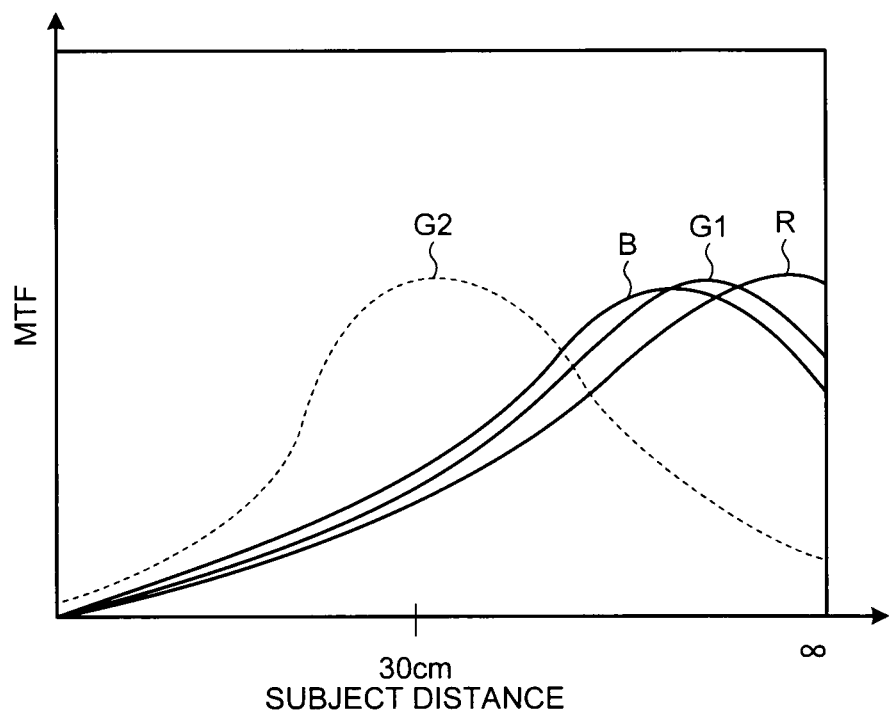
FIG. 3 is a graph representing an example of MTF characteristics of imaging lenses of sub-camera modules for respective colors.

FIG. 3 is a graph representing an example of MTF characteristics of the imaging lenses 14 of the sub-camera modules for respective colors. The graph shown in the figure represents a relation between a subject distance and an MTF at ½ Nyquist concerning a G1 component, an R component, a G2 component, and a B component. The ordinate of the graph indicates the MTF and the abscissa indicates the subject distance. The MTF is a function indicating modulation of an image of a sine wave object with respect to an increase in a space frequency.

All the imaging lenses 14 provided in the sub-camera modules for G1, R, and B are designed to be best-focused in infinity. On the other hand, the imaging lens 14 provided in the sub-camera module for G2 is designed to be best-focused at near distance of, for example, about 30 centimeters. In this way, the sub-camera module for G1 and the sub-camera modules for G2 that pick up green components of the subject images among the four sub-camera modules include the imaging lenses 14, subject distances of which when best-focused are set different from each other.

Figure 4:
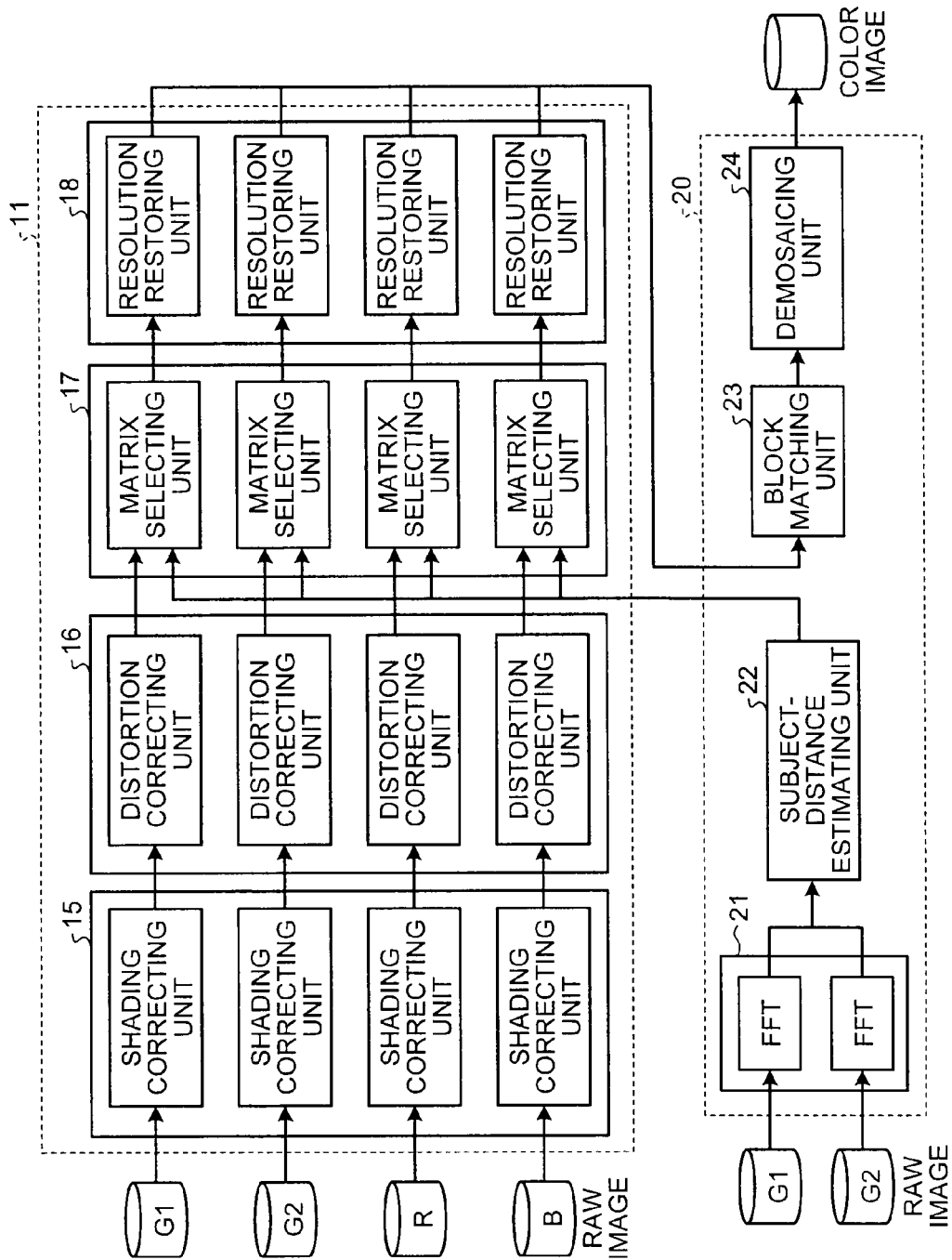
FIG. 4 is a block diagram of the configuration of an image processing apparatus for processing of a signal obtained by imaging in the camera module.

FIG. 4 is a block diagram of the configuration of an image processing apparatus for processing of a signal obtained by imaging in the camera module 10. The image processing apparatus is roughly divided into the image sensor unit 11 at a pre-stage and a processor 20 at a post-stage. The image sensor unit 11 includes a shading correcting unit 15, a distortion correcting unit 16, a matrix selecting unit 17, and a resolution restoring unit 18. The shading correcting unit 15, the distortion correcting unit 16, the matrix selecting unit 17, and the resolution restoring unit 18 carry out signal processing for each of image data (RAW images) of G1, G2, R, and B obtained by the four sub-camera modules.

The shading correcting unit 15 corrects luminance unevenness caused by the imaging lenses 14, in particular, a light amount difference between the center and the peripheral portions of a subject image (shading correction). The distortion correcting unit 16 corrects distortion of the subject image due to positional deviation caused by the imaging lenses 14.

The processor 20 includes a fast Fourier transform (FFT) unit 21, a subject-distance estimating unit 22, a block matching unit 23, and a demosaicing unit 24. The FFT unit 21 captures the RAW images of G1 and G2 and executes conversion from an actual space to a frequency space by the FFT. The subject-distance estimating unit 22 estimates a subject distance between the camera module 10 and the subject.

The matrix selecting unit 17 of the image sensor unit 11 selects, based on the subject distance estimated by the subject-distance estimating unit 22, a matrix for resolution restoration optimum for the colors R, G, and B. In this embodiment, the matrix for resolution restoration is a deconvolution matrix with which an effect equivalent to an effect of an image restoration algorithm can be obtained. The matrix selecting unit 17 selects an optimum matrix for resolution restoration from, for example, two matrixes for resolution restoration prepared in advance. The matrix selecting unit 17 only has to select the optimum matrix for resolution restoration from at least two or more matrixes for resolution restoration.

The resolution restoring unit 18 carries out resolution restoration processing based on the matrix for resolution restoration selected by the matrix selecting unit 17. The resolution restoration processing is carried out for each of the image data of G1, G2, R, and B obtained by the four sub-camera modules. An effect of the resolution restoration depends on an algorithm used for the restoration. For the resolution restoration processing, to restore an image close to an original subject image, for example, the Richardson-Lucy method is used.

The block matching unit 23 of the processor 20 carries out block matching (pattern matching) processing on the image data of G1, G2, R, and B subjected to the processing by the shading correcting unit 15, the distortion correcting unit 16, the matrix selecting unit 17, and the resolution restoring unit 18. The block matching unit 23 applies alignment by the block matching processing to subject images obtained by the sub-camera modules.

Figure 5:
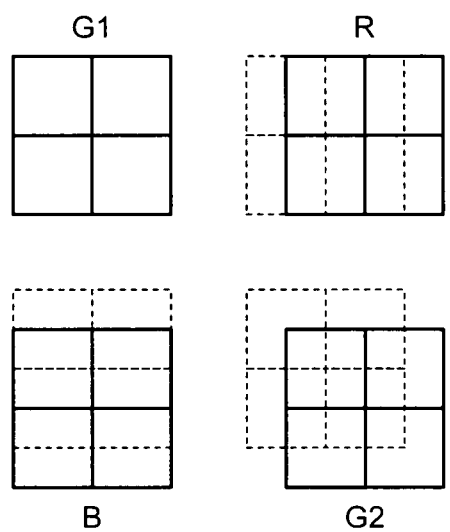
FIG. 5 is a diagram for explaining alignment of subject images by a block matching unit.

FIG. 5 is a diagram for explaining the alignment of the subject images by the block matching unit 23. It is assumed that all squares shown in the figure represent pixels. Concerning an R pixel, a B pixel, and a G2 pixel, a state in which imaging positions of the subject images coincide with one another is represented by broken lines. A state in which the R pixel, the B pixel, and the G2 pixel are shifted by a half pixel with respect to the G1 pixel is represented by solid lines. The R pixel is shifted by a half pixel in a lateral direction in the figure with respect to the G1 pixel. The B pixel is shifted by a half pixel in a longitudinal direction in the figure with respect to the G1 pixel. The G2 pixel is shifted by a half pixel in the lateral direction and the longitudinal direction with respect to the G1 pixel. The block matching unit 23 performs, based on the position of the G1 pixel, alignment in a sub-pixel unit such that the R pixel, the B pixel, and the G2 pixel are shifted by a half pixel in predetermined directions.

Referring back to FIG. 4, the demosaicing unit 24 carries out demosaicing processing on an image obtained by the block matching processing to thereby synthesize a color image. The demosaicing unit 24 applies, assuming that the image obtained by the block matching processing is an image by the Bayer array, pixel interpolation processing to the image to thereby generate a signal value of an insufficient color component. In this embodiment, the subject images picked up by the sub-camera modules are shifted to synthesize a color image, whereby a predetermined total number of pixels is obtained. The image processing apparatus outputs the color image synthesized in this way. The procedure of the processing explained in this embodiment is an example. Addition of other processing, a change of the order of the processing, or the like can be performed as appropriate.

The image processing apparatus is not limited to the shift of the subject images according to the arrangement of the sub-camera modules. For example, after mapping in the sub-pixel unit, the image processing apparatus can generate the Bayer array by applying an interpolation method such as a bilinear or bicubic method. Such a method is useful when it is difficult to physically control a shift amount of the subject images, for example, when the influence of an attachment error of the imaging elements, manufacturing fluctuation of the camera module 10, or the like is large. The method is suitable for refining the imaging elements. The camera module 10 according to this embodiment can be increased in sensitivity compared with that in the past. Therefore, even when accuracy in the sub-pixel unit cannot be obtained, for example, the predetermined total number of pixels can be obtained by up-sampling.

Figure 6:
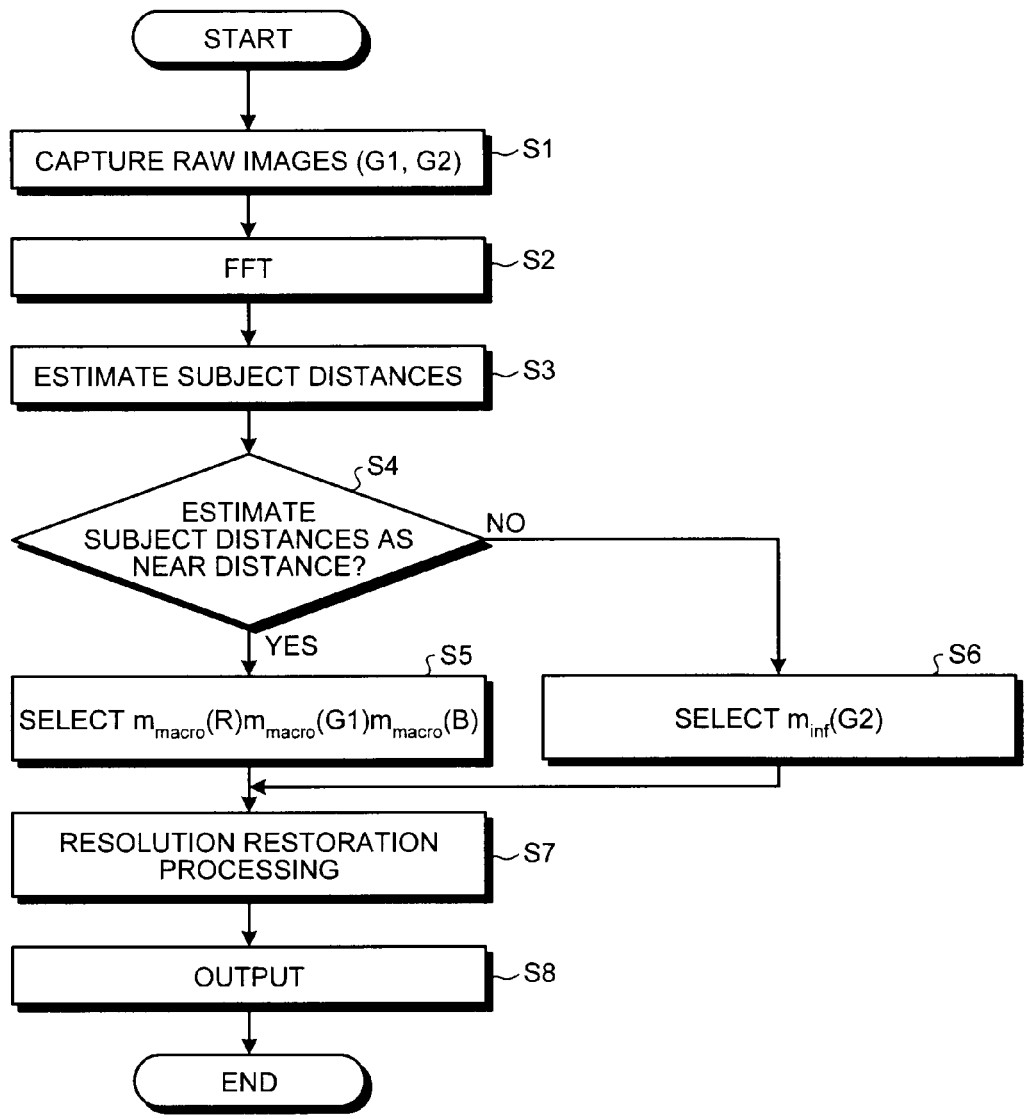
FIG. 6 is a flowchart for explaining a procedure of processing in an FFT unit, a subject-distance estimating unit, a matrix selecting unit, and resolution restoring unit.

FIG. 6 is a flowchart for explaining the procedure of the processing in the FFT unit 21, the subject-distance estimating unit 22, the matrix selecting unit 17, and the resolution restoring unit 18. At step S1, the FFT unit 21 captures RAW images of G1 and G2. At step S2, the FFT unit 21 executes conversion from an actual space to a frequency space by the FFT.

At step S3, the subject-distance estimating unit 22 estimates a subject distance. The subject-distance estimating unit 22 compares space frequency characteristics quantified concerning G1 and G2 and selects the RAW image including larger number of high-frequency components as a subject image having a clear contour. When the subject-distance estimating unit 22 selects the RAW image of G1 determining that the RAW image includes a larger number of high-frequency components, the subject-distance estimating unit 22 estimates that the subject distance is infinity. When the subject-distance estimating unit 22 selects the RAW image of G2 determining that the RAW image includes a larger number of high-frequency components, the subject-distance estimating unit 22 estimates that the subject distance is near distance.

When the subject-distance estimating unit 22 estimates that the subject distance is the near distance (Yes at step S4), the matrix selecting unit 17 selects a matrix for resolution restoration $m_{macro}(R)m_{macro}(G1)m_{macro}(B)$ for carrying out resolution restoration processing in the near distance on the image data of R, G1, and B for which the imaging lenses 14 are designed to be best-focused in the infinity.

On the other hand, when the subject-distance estimating unit 22 estimates that the subject distance is the infinity (No at step S4), the matrix selecting unit 17 selects a matrix for resolution restoration $m_{inf}(G2)$ for carrying out resolution restoration processing in the infinity on the image data of G2 for which the imaging lens 14 is designed to be best-focused in the near distance.

The resolution restoring unit 18 carries out the resolution restoration processing based on the matrix for resolution restoration selected at step S5 or step S6. When $m_{macro}(R)m_{macro}(G1)m_{macro}(B)$ is selected as the matrix for resolution restoration, the resolution restoring unit 18 carries out the resolution restoration processing aiming at the near distance on the image data of R, G1, and B. At step S8, the resolution restoring unit 18 outputs the image data. The resolution restoring unit 18 can omit the resolution restoration processing concerning the image data of G2 and directly output the image data at step S8.

When $m_{inf}(G2)$ is selected as the matrix for resolution restoration, the resolution restoring unit 18 carries out the resolution restoration processing aiming at the infinity on the image data of G2. At step S8, the resolution restoring unit 18 outputs the image data. The resolution restoring unit 18 can omit the resolution restoration processing concerning the image data of R, G1, and B and directly output the image data at step S8.

The camera module 10 according to this embodiment includes the imaging lenses 14 with best focus set different and carries out the resolution restoration processing by the matrix for resolution restoration selected according to the estimated subject distance. This makes it possible to secure depth of field and obtain sufficient resolution corresponding to the subject distance. Because the fixed-focus imaging lenses 14 are used, the camera module 10 can be reduced in thickness and size. This makes it possible to reduce thickness and size of a camera module and perform high-sensitivity photographing at sufficient depth of field.

The subject-distance estimating unit 22 is not limited to the subject-distance estimating unit that estimates whether a subject distance is near distance or infinity. The subject-distance estimating unit 22 only has to be a subject-distance estimating unit that estimates which of two focal length ranges the subject distance is. The subject-distance estimating unit 22 can be a subject-distance estimating unit that estimates which of three or more focal length ranges the subject distance is. For example, in addition to the two focal length ranges in which the subject distance is the near distance and the infinity, the subject-distance estimating unit 22 can separately estimate focal length range of 1 meter to 3 meters. The matrix selecting unit 17 can prepare three or more matrixes for resolution restoration according to focal length ranges of the subject distance to be estimated and select an optimum matrix for resolution restoration out of the matrixes for resolution restoration.

The lenslet 12 only has to be a lenslet in which at least two of the imaging lenses 14 are imaging lenses, subject distances of which when best-focused are set different from each other. The number of imaging lenses 14, subject distances of which when best-focused are set different from one other, can be three or more. The subject distances of the imaging lenses 14 when best-focused can be arbitrarily selected according to a use of photographing, the level of a photographing frequency for each of the subject distances, or the like. For example, a best focus position in the near distance is desirably set in a range in which resolution in the infinity does not extremely fall. This makes it possible to secure sufficient depth of field.

The camera module 10 is not limited to the camera module including the four sub-camera modules, i.e., the one sub-camera module R and the one sub-camera module for B and the two sub-camera modules for G. The camera module 10 only has to include a plurality of sub-camera modules. The number of sub-camera modules can be other than four. The subject distances of the imaging lenses 14 when best-focused are set different from each other not only between the sub-camera modules for G. The subject distances can be set different between sub-camera modules for any color light. A plurality of sub-camera modules that pickup the same color component can be used for estimation of subject distances by setting subject distances of the sub-camera modules different from one another.

FIG. 7 is a block diagram of the configuration of an image processing apparatus according to a modification of this embodiment. The image sensor unit 11 includes a parameter storing unit 19 in addition to the shading correcting unit 15, the distortion correcting unit 16, the matrix selecting unit 17, and the resolution restoring unit 18. Parameters necessary for the processing in the image sensor unit 11 are written in the parameter storing unit 19. The parameter storing unit 19 stores the parameters. The image sensor unit 11 stores individual information of the camera module 10 in the parameter storing unit 19 as parameters. The individual information is information concerning individual differences of each product such as a manufacturing error of a component such as a lens and an assembly error of components.

The shading correcting unit 15 subjects subject images to shading correction referring to the parameters stored in the parameter storing unit 19. The distortion correcting unit 16 corrects distortion of the subject images referring to the parameters stored in the parameter storing unit 19. This makes it possible to perform image processing corresponding to an individual difference of the camera module 10.

The image processing apparatus is not limited to the configuration for carrying out the kinds of processing from the shading processing to the resolution restoration processing in the image sensor unit 11. The image processing apparatus can carry out a part or all of the kinds of processing from the shading processing to the resolution restoration processing in the processor 20. The image processing apparatus is not limited to the configuration for carrying out the FFT, the subject distance estimation, the block matching processing, and the demosaicing processing in the processor 20. If the circuit size and the power consumption of the image sensor unit 11 allow, the image processing apparatus can carry out a part or all of the FFT, the subject distance estimation, the block matching processing, and the demosaicing processing in the image sensor unit 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera module comprising:
a plurality of sub-camera modules including imaging elements that pick up subject images and imaging lenses that make light captured from a subject incident on the imaging elements;
a resolution restoring unit that carries out resolution restoration processing for the subject images;
a subject-distance estimating unit that estimates subject distances of the subject images; and
a matrix selecting unit that selects a deconvolution matrix based on the subject distances estimated by the subject-distance estimating unit, wherein
at least two of the sub-camera modules include the imaging lenses, subject distances of which when best-focused are set different from each other, the subject distances being distances between the sub-camera modules and the subject, and
the resolution restoring unit carries out, based on the deconvolution matrix selected by the matrix selecting unit, the resolution restoration processing for each of image data obtained by the sub-camera modules.

2. The camera module according to claim 1, wherein the subject-distance estimating unit estimates the subject distances based on the image data obtained by the at least two sub-camera modules, the subject distances of which when best-focused are set different from each other.

3. The camera module according to claim 2, wherein the subject-distance estimating unit estimates the subject distances by comparing space frequency characteristics quantified from the image data obtained by the at least two sub-camera modules.

4. An image processing apparatus comprising:
a resolution restoring unit that carries out resolution restoration processing for subject images picked up by a plurality of sub-camera modules;
a subject-distance estimating unit that estimates subject distances between the sub-camera modules and a subject; and
a matrix selecting unit that selects a deconvolution matrix based on the subject distances estimated by the subject-distance estimating unit, wherein
the resolution restoring unit carries out, based on the deconvolution matrix selected by the matrix selecting unit, the resolution restoration processing for each of image data obtained by the sub-camera modules.

5. The image processing apparatus according to claim 4, wherein
the sub-camera modules include at least two sub-camera modules, the subject distances of which when best-focused are set different from each other, and
the subject-distance estimating unit estimates the subject distances based on the image data obtained by the at least two sub-camera modules.

6. The image processing apparatus according to claim 5, wherein the subject-distance estimating unit estimates the subject distances by comparing space frequency characteristics quantified from the image data obtained by the at least two sub-camera modules.

7. The image processing apparatus according to claim 5, wherein
the matrix selecting unit selects, when the subject-distance estimating unit estimates that the subject distances are near distance, the deconvolution matrix for carrying out the resolution restoration processing in the near distance on the image data obtained by the sub-camera modules including the imaging lenses best-focused in infinity, and
the matrix selecting unit selects, when the subject-distance estimating unit estimates that the subject distances are the infinite, the deconvolution matrix for carrying out the resolution restoration processing in the infinite on the image data obtained by the sub-camera modules including the imaging lenses best-focused in the near distance.

8. The image processing apparatus according to claim 7, wherein the resolution restoring unit omits the resolution restoration processing concerning the image data other than the image data on which the resolution restoration processing is carried out based on the deconvolution matrix selected by the matrix selecting unit and outputs the image data.

9. An image recording method comprising:
picking up subject images with a plurality of sub-camera modules including at least two sub-camera modules, subject distances of which when best-focused are set different from each other, the subject distances being distances between the sub-camera modules and a subject;

carrying out resolution restoration processing for the subject images;

estimating the subject distances of the subject images;

selecting a deconvolution matrix based on the estimated subject distances; and carrying out, based on the selected deconvolution matrix, the resolution restoration processing for each of image data obtained by the sub-camera modules.

10. The image recording method according to claim 9, further comprising:

picking up color components of the subject images respectively with the sub-camera modules; and picking up same color components of the subject images with the at least two sub-camera modules, the subject distances of which when best-focused are set different from each other.

11. The image recording method according to claim 9, further comprising estimating the subject distances based on the image data obtained by the at least two sub-camera modules, the subject distances of which when best-focused are set different from each other.

12. The image recording method according to claim 11, further comprising estimating the subject distances by comparing space frequency characteristics quantified from the image data obtained by the at least two sub-camera modules.

13. The image recording method according to claim 11, further comprising:

selecting, when it is estimated that the subject distances are near distance, the deconvolution matrix for carrying out the resolution restoration processing in the near distance on the image data obtained by the sub-camera modules best-focused in infinity; and selecting, when it is estimated that the subject distances are the infinite, the deconvolution matrix for carrying out the resolution restoration processing in the infinite on the image data obtained by the sub-camera modules best-focused in the near distance.

14. The image recording method according to claim 13, further comprising omitting the resolution restoration processing concerning the image data other than the image data on which the resolution restoration processing is carried out based on the selected deconvolution matrix.

15. The image recording method according to claim 9, further comprising:

setting one of the sub-camera modules as a reference sub-camera module; and shifting imaging positions of the subject images by the sub-camera modules other than the reference sub-camera module with respect to an imaging position of the subject image by the reference sub-camera module.

16. The camera module according to claim 1, wherein the sub-camera modules respectively pick up color components of the subject images, and at least two sub-camera modules that pick up same color components of the subject images among the sub-camera modules include the imaging lenses, subject distances of which when best-focused are set different from each other.

17. The camera module according to claim 16, wherein the same color components are green components.

18. The camera module according to claim 1, wherein the imaging lenses of the sub-camera modules configure a lenslet.

19. The camera module according to claim 1, wherein one of the sub-camera modules is set as a reference sub-camera module, and imaging positions of the subject images by the sub-camera modules other than the reference sub-camera module are shifted with respect to an imaging position of the subject image by the reference sub-camera module.

* * * * *